No. 820,811. PATENTED MAY 15, 1906.
S. T. MUFFLY.
APPARATUS FOR EXTRACTING PRECIOUS METALS FROM THEIR ORES.
APPLICATION FILED AUG. 14, 1905.
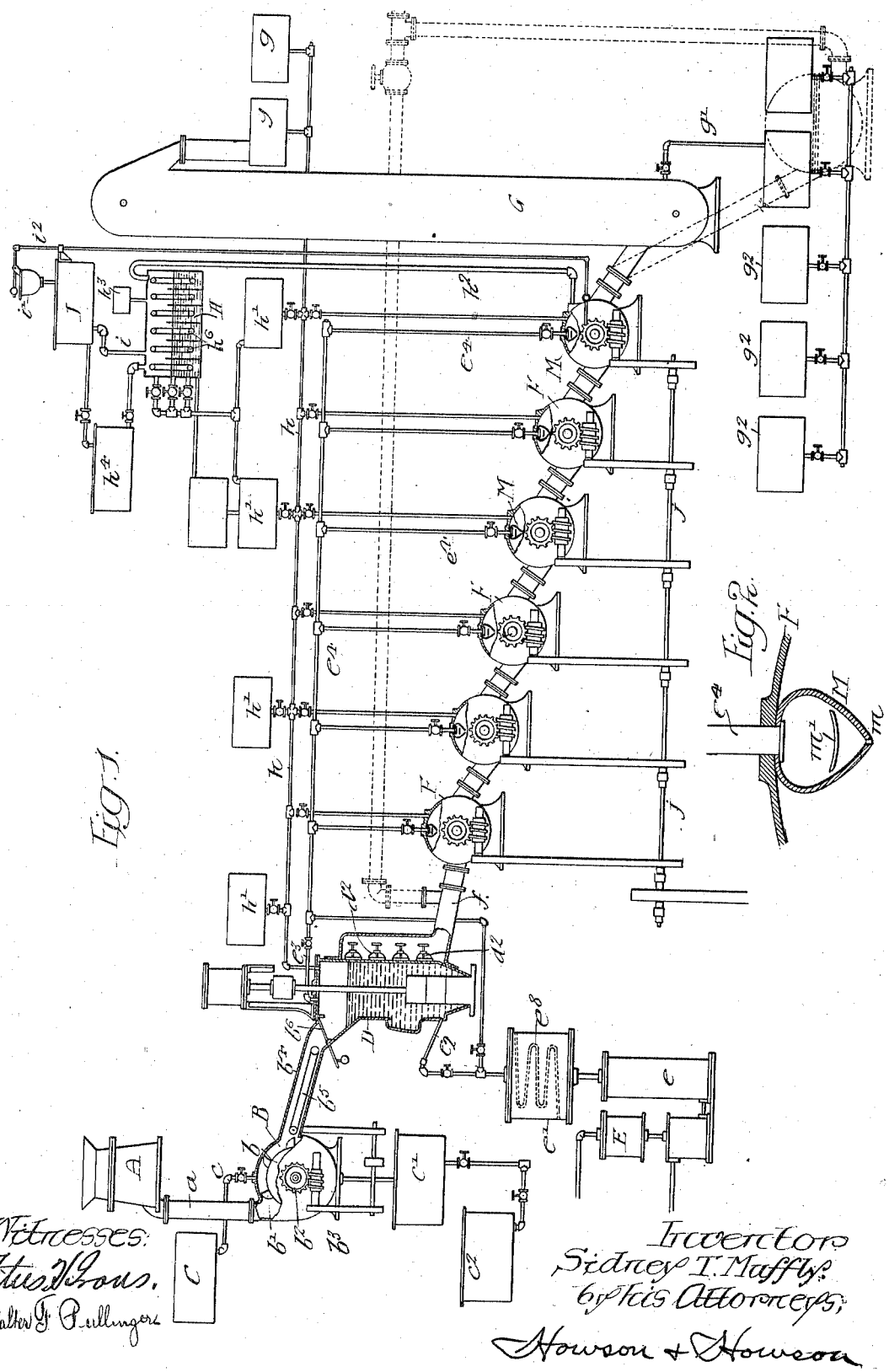

UNITED STATES PATENT OFFICE.

SIDNEY T. MUFFLY, OF PHILADELPHIA, PENNSYLVANIA, ASSIGNOR TO PHILADELPHIA CYANIDE PROCESS COMPANY, OF WILMINGTON, DELAWARE, AND PHILADELPHIA, PENNSYLVANIA, A CORPORATION OF DELAWARE.

APPARATUS FOR EXTRACTING PRECIOUS METALS FROM THEIR ORES.

No. 820,811.     Specification of Letters Patent.     Patented May 15, 1906.

Application filed August 14, 1905. Serial No. 274,120.

*To all whom it may concern:*

Be it known that I, SIDNEY T. MUFFLY, a citizen of the United States, residing in Philadelphia, Pennsylvania, have invented certain Improvements in an Apparatus for Extracting Precious Metals from their Ores, of which the following is a specification.

One object of my invention is to provide a novel combination of apparatus by which not only the time required for the treatment of a given body of ore is greatly reduced over what has hitherto been considered necessary in cyanid processes, but the amount of cyanid solvent employed is also much less than hitherto.

It is further desired to provide a combination of apparatus by which it shall be possible while treating ores to save and repeatedly use the cyanid solvent, whose active element, cyanogen, is evolved in the leaching of ores as hydrocyanic-acid gas and at the present time is ordinarily lost.

I further desire to provide a system by which the labor necessary in connection with the treatment of ores shall be reduced to a minimum and which shall have such an efficiency of operation that it shall be commercially possible to treat with profit low-grade ores running, for example, about one to two dollars per ton of ore.

Another object of the invention is to provide a system or construction of apparatus in which successive bodies of ore may be continuously treated and by which the cyanogen evolved as hydrocyanic-acid gas is cyclicly restored to the cyanid solvent and reused.

These objects I attain as hereinafter set forth, reference being had to the accompanying drawings, in which—

Figure 1 is a representation, to some extent diagrammatic, of the apparatus comprising my invention; and Fig. 2 is an enlarged vertical section illustrating a portion of the detail construction of the lixiviators.

The apparatus hereinafter described and claimed is primarily designed to carry out the process of extracting precious metals from their ores covered in an application for patent made by me of even date herewith, and for this purpose I first provide a device for neutralizing the acids or acid salts found in the ore, this being accomplished by means of a solution of alkaline hydrate applied to the crushed ore in a neutralizer. Immediately thereafter I deliver this washed and neutralized ore to the interior of a hermetically-sealed stamp-mortar containing an alkaline cyanid solution exposed to the direct downward pressure of compressed air. This inclosed stamp-mortar forms one end of what may be described as a closed conduit within which the ore is treated, said conduit consisting, beyond said stamp-mortar, of a number of lixiviators connected in series, in which the pulp is successively subjected to fresh bodies of cyanid solution until it is finally delivered as tailings to a device whereby it is removed. The conduit formed by the lixiviators and their connections and the stamp-mortar is at all times supplied with air under pressure greater than that of the atmosphere, so that the liquid in this conduit always has direct downward pressure of air upon its surface. The hydrocyanic-acid gas evolved in the process of lixiviation is conducted to a suitable condensing or absorbing chamber, where it is dissolved in a cyanid solution, which is subsequently used in the treatment of further bodies of ore.

In the above drawings, A represents an ore, crusher so constructed and adjusted that the ore delivered from it will be in pieces not exceeding a quarter to half a cubic inch in volume. Connected to this crusher by a chute $a$ is a neutralizer B, connected, by means of a pipe $c$, with a tank C, there being also connected with said neutralizer, preferably to the lower part thereof, a filter-tank $c'$, in turn connected with a storage-tank $c^2$.

The neutralizer B preferably consists of an inclosed casing having within it a revoluble drum $b$, upon which are blades or buckets $b'$, there being any desired driving means for turning the drum, in the present instance a worm-wheel $b^2$, fixed to the drum-shaft, and a worm $b^3$, to which power is applied and which meshes with said wheel.

A stamp-mortar D, inclosed in an airtight casing, is connected to the neutralizer B by means of a closed conduit $b^4$, which contains a conveying device $b^5$, driven in any desired manner, for the purpose of transferring crushed ore from the neutralizer B to said stamp. This conduit is provided with an automatic valve $b^6$, counterweighted, so as to normally remain closed to cut off communication between the interior of the stamp-mortar and the neutralizer B, the valve, however, being capable of automatically opening when a body of ore is placed upon it.

An air-compressor E, provided with a reservoir $e$ and a heating-chamber $e'$, is connected so as to supply air to the interior of the stamp-mortar either through a pipe $e^2$, which is placed to deliver air adjacent to the dies and stamps for the purpose hereinafter mentioned, or through a pipe $e^3$, which delivers the air into the upper part of the stamp-mortar casing, or through both of said pipes. A coil of pipe $e^8$ is usually placed in the chamber $e'$, and this is preferably connected to the exhaust of the stamp-operating engines, so as to supply heat to the compressed air in said chamber.

Pulp and liquid from the stamp-mortar are conducted through a conduit $f$, which connects the first of a series of lixiviators F to the stamp-mortar, and these are so arranged that the last of them delivers the material to an inclosed bucket conveyer G, discharging into tanks, such as are shown at $g$. Liquid from the lixiviators F may be drawn from the bottom of the inclosed conveyer-casing G through a pipe $g'$ into any of a series of filter-tanks $g^2$. The specific construction of the lixiviators used is described and claimed in the application for United States Patent, Serial No. 281,672, filed by me October 6, 1905.

Connection is made between the air-heater and each of the lixiviators F through branch pipes connected to a pipe $e^4$, in addition to which each of said lixiviators, as well as the stamp-casing, has connected to it branches from a pipe $h$ in connection with any or all of the tanks $h'$. The last of the lixiviators F is connected by a pipe $h^2$ to a condensing or vapor-absorbing chamber H, in which are placed a number of vertically-placed porous partitions formed by endless aprons $h^6$, carried upon rollers driven in any desired manner and dipping into a solution delivered from a suitable tank $h^3$. These endless aprons alternate with fixed partitions extending up from the bottom of the chamber H and forming a series of compartments, each of which contains the above-mentioned solution. Liquid from this condensing-chamber may pass through suitable pipes to the tanks $h'$, while the tank $h^4$ is arranged to deliver into it. The condensing apparatus referred to above and shown in the drawings herewith forms the subject of a separate application for United States Patent, Serial No. 281,673, filed by me October 6, 1905.

The box I is connected by a pipe $i$ with the chamber H and has some form of valve $i'$ designed to be automatically and periodically opened by a rod $i^2$, actuated by ratchet mechanism actuated from the driving means of the lixiviators F. In the present instance these lixiviators are of the same construction as the neutralizer B, and they are all driven by a common shaft $j$ through belts which drive worm-gearing operative upon the main shaft of the bucket or paddle carrying drum within the lixivator-casing.

Under operating conditions ore is delivered from the crusher A in a comminuted state to the neutralizer B, where it is intimately mixed with a neutralizing solution supplied from the tank C, which solution preferably consists of an alkaline hydrate, such as sodium or potassium hydrate. This solution is designed to neutralize any acid salts which may be present in the ore due to the oxidation of sulfids or as a result of the action of water on decaying vegetable matter.

The revolution of the drum $b$ of the neutralizer B deposits the neutralized and washed ore upon the conveyer $b^5$, which delivers it to the counterweighted valve $b^6$, and this automatically operates to discharge said ore into the stamp-mortar D. The interior of the stamp-mortar is filled with a weak cyanid solution, which may vary from .1 or less to .5 of one per cent., as the nature of an ore may require, this solution being delivered from the tank $h'$. Air is also supplied from the compressor E through pipe $e^3$ to the interior of the stamp-mortar, and such air is preferably kept at a temperature of 60° or higher, by means of the heating-coil $e^8$, and is at a pressure of ten pounds or greater to the square inch.

If the ore under treatment is of a slaty or argillaceous nature, it may be also advisable to deliver air under pressure through the pipe $e^2$ in order to prevent the pulp or ore clogging the stamp. Screens of any desired mesh are provided at $d^2$, so that the pulp delivered from the stamp is of a certain fineness, and said pulp with a portion of the weak cyanid solution flows to the various lixivators F, where it is brought into intimate contact with a succession of fresh bodies of cyanid solution which are at all times exposed to an air-pressure greater than that of the atmosphere, acting directly downwardly upon their surfaces and which is delivered through pipes $e^4$.

I have found that the direct downward pressure of air greater than that of the atmosphere, exerted upon the surface of the cyanid solution, very materially hastens the solvent action of the cyanid solution, and by this means I am enabled to accomplish one of the important objects of my invention—namely, the shortening of the time necessary to treat a given body of ore.

I have also found that by treating the ore within a closed container and under air-pressure acting directly downward upon the surface of the solution said solution is caused to extract a much larger percentage of metal from the ore—in some cases practically all of it—where hitherto it has been possible to extract by the cyanid process but a comparatively small amount of the precious metal, depending upon the complex or free nature of the ore.

It will be understood that the chemical reactions occurring in the treatment of a body of ore with a solution of a cyanid necessarily result in the freeing of relatively large amounts of hydrocyanic gas, and instead of allowing this gas to escape and go to waste as has hitherto been the custom, I cause it, with air under pressure, to pass out of the last of the lixiviators F through the pipe $h^2$ and deliver it to a condensing-chamber H. In this latter a solution, preferably containing a double cyanid, such as cyanid of potassium and bromin, absorbs the hydrocyanic-acid gas, by reason of the fact that this latter is soluble in water and because the presence of the bromin compound materially aids and accelerates such action, and I cause such solution to be delivered from time to time or continuously, as desired, to the tanks $h'$, from whence it is permitted to flow to the stamp-mortar and the various lixiviators, where it is used again to treat ores.

By causing acid gas to pass through aprons of burlap saturated by the above-noted solution the latter very completely and quickly absorbs it, and in order to prevent the passage of any compounds or vapors of base metallic salts frequently carried with the hydrocyanic-acid gas and the compressed air I deliver into the condensing-chamber a solution of ammonic hydrate from the vessel $h^3$, thereby forming hydrates with any base metallic compounds so entering and causing these to remain in the chamber H.

The compressed air is periodically allowed to escape from the chamber H through the box I, the valve $i'$ on this box being intermittently opened by action of the ratchet mechanism upon the rod $i^2$.

From the last lixiviator F the ore-pulp or tailings, from which the gold and silver has been dissolved, pass into inclosed conveyer G and are carried by buckets to covered tanks $g$, containing wash-water, to recover a small amount of the metals remaining in cyanid moisture. After removing the wash-water for further use the tailings are then discharged from tanks $g$ to a waste-dump, or, if containing valuable by-products, to some other desired place by means of the sand-pump.

The cyanid solution containing the precious metals is drained from conveyer G through pipe $g'$ into tanks $g^2$, where it is filtered, and flows to storage-tanks for treatment in a series of electrolytic or other apparatus (not shown) for precipitation of the gold and silver, the solution thereafter being raised by a pump (not shown) to tanks and strengthened with fresh cyanid solvent compound for further use in treating ores.

It will be understood by those skilled in the art that by providing means for regenerating and reusing the cyanogen evolved as hydrocyanic-acid gas during the operation of my system I am enabled to greatly reduce the cost of operation of the same, since the cyanid solvent constitutes one of the expensive items in the operation thereof. Further, by the use of compressed air during the stamping and chemical action on the ore-pulp, not only is the time of treatment of the ore greatly lessened, but a very much greater proportion of the precious metals contained therein is caused to be dissolved by the cyanid than has hitherto been considered possible.

I claim—

1. A system for treating ores to extract the precious metals therein contained, which consists of the combination of an ore-neutralizing device, an inclosed stamp-mortar, and a closed conduit connecting said device with the stamp, substantially as described.

2. A system for treating ores to extract the precious metals therein contained, which consists of the combination of an ore-neutralizing device, an inclosed stamp-mortar, a closed conduit connecting said device with said stamp-mortar, and an automatic valve in said conduit, substantially as described.

3. A system for treating ores to extract the precious metals therein contained, which consists of the combination of an ore-neutralizing device, an inclosed stamp-mortar, and a closed conduit connecting said device with the stamp-mortar, said conduit having a conveyer placed to receive material from said neutralizing device, and an automatic valve placed to receive material from the conveyer, substantially as described.

4. A system for treating ores to extract the precious metals therein contained, which consists of the combination of an ore-neutralizing device, a stamp-mortar having an air-tight casing, and a source of air-supply connected to deliver air to said stamp-mortar casing, substantially as described.

5. A system for treating ore to extract the precious metals therein contained, which consists of the combination of an ore-neutralizing device, a stamp-mortar having an air-tight casing, and a source of air-supply connected to deliver air to the said stamp-mortar and casing, said mortar having within it means for discharging the air both above the surface of a body of liquid in it and also under the surface of said liquid adjacent to the stamps and dies, substantially as described.

6. A system for treating ores to extract the precious metals therein contained, the same consisting of an inclosed conduit, an ore-neutralizing device discharging into one end of said conduit, and a stamp-mortar and lixiviating means, all operative in the conduit, substantially as described.

7. A system for treating ores to extract the precious metals therein contained, the same consisting of an inclosed conduit, a stamp-mortar, lixiviating means connected to receive material from the stamp-mortar, and a source of air-supply connected to cause direct downward pressure upon the bodies of liquid in said conduit, substantially as described.

8. A system for treating ores to extract the precious metals therein contained, which includes a crusher, a neutralizing device, a stamp-mortar, a lixiviating device, means connecting said parts to form a continuous inclosed passage for ore, and a compressor connected to said passage to maintain the air in the stamp-mortar and in the lixiviating device under a pressure above the normal, substantially as described.

9. A system for treating ores to extract the precious metals therein contained which includes a stamp-mortar having an inclosed casing, a series of lixiviators connected to the stamp-mortar, each lixiviator consisting of a casing having a drum provided with buckets and driving means, and means for supplying cyanid solution and air under pressure to the stamp-mortar and to the lixiviator-casings, substantially as described.

10. In a system for treating ores to extract the precious metals therein contained, the combination of an inclosed stamp-mortar, a series of inclosed lixiviators connected to receive material from the stamp, a vessel for receiving liquid from the lixiviators, means for removing the tailings, and an absorbing apparatus connected to said lixiviators for receiving the hydrocyanic-acid gas evolved in said lixiviators, substantially as described.

11. A system for treating ores to extract the precious metals therein contained which includes an inclosed stamp-mortar, a series of inclosed lixiviators connected to receive material from the stamp, a series of receiving-tanks, an absorbing device and a conveyer, all connected to the lixiviators, said absorbing devices consisting of a chamber having connected to it a source of supply for solution capable of absorbing hydrocyanic-acid fumes, substantially as described.

12. A system for the treatment of ores of precious metals including a series of lixiviators and an absorbing-chamber connected thereto, said chamber having series of partitions forming a tortuous passage therethrough and being provided with means whereby a solvent solution may be supplied to said partitions, substantially as described.

13. A system for the treatment of the ores of precious metals including a series of lixiviators and a gas-absorbing chamber connected thereto, said chamber having series of partitions forming a tortuous passage therethrough, one series of said partitions being formed of fabric aprons having means whereby they are made to dip into a body of liquid in the bottom of the chamber, and means whereby their surfaces are supplied with relatively thin films of liquid.

14. In a system for the treatment of the ores of precious metals, the combination of a series of lixiviators, a source of compressed air connected thereto, means for receiving liquid and pulp after said materials have passed through said lixiviators an absorbing-chamber for receiving the hydrocyanic-acid gas evolved, and means for permitting the escape of the compressed air after it has passed through the absorbing-chamber, substantially as described.

15. In a system for the treatment of the ores of precious metals, the combination of a series of lixiviators, a source of compressed air, means for receiving liquid and pulp after said materials have passed through said lixiviators, with an absorbing-chamber connected to the lixiviators for receiving the hydrocyanic-acid gas evolved, and positively-acting means for periodically permitting the escape of the compressed air after it has passed through the absorbing-chamber, substantially as described.

16. A chamber for absorbing gas consisting of a container having partitions extending upwardly from its bottom, pairs of rollers between certain of the partitions, and fabric aprons extending vertically between each pair of rollers and entering bodies of liquid in the lower part of the chamber, substantially as described.

17. A chamber for absorbing gas, consisting of a container having partitions extending upwardly from its bottom, pairs of rollers between certain of the partitions, fabric aprons extending vertically between each pair of rollers and entering bodies of liquid in the lower part of the chamber, and means for turning certain of the rollers to cause movement of the aprons, substantially as described.

18. A system including the combination of an inclosed stamp-mortar and a series of inclosed lixiviators, with a chamber connected thereto for absorbing hydrocyanic-acid gas evolved, a container for cyanid solution, and a container for alkaline-hydrate solution, both connected to said absorbing-chamber, substantially as described.

19. In a system for the treatment of the ores of precious metals, the combination of a stamp-mortar, capable of holding liquid, a casing therefor capable of holding compressed air, a source of compressed air, and means for connecting said source of air with the casing, said connecting means including a pipe connecting with the top of the stamp-mortar and a second pipe placed to discharge adjacent to the stamps and dies, substantially as described.

20. In a system for treatment of fine ore sand, clays, concentrates and mail-tailings containing precious metals, which consists of the combination of an acid-neutralizer with a chute at the back for the material to enter, a closed conduit at the front having a conveyer with an automatic valve placed to discharge the material to a series of lixiviators connecting with a gas-absorbing chamber having an automatic valve, connection with an ore-conveyer, with a sand-pump, with a solution-pump, with solution-tanks, with an air-compressor, and with an electrolytic or other gold and silver precipitating apparatus, substantially as described.

21. In a system for the treatment of ores containing precious metals, which consists of the combinations of an ore-crusher connected by a chute with an acid-neutralizer at the back for the broken ore to enter, with a closed conduit at the front having a conveyer with an automatic valve to discharge the broken ore into a fine crushing or pulverzing mill having pipe attachments for supplying air under pressure, a pipe for supplying solvent solution, connecting by an inclosed conduit with a series of lixiviators having air-receivers, with pipe connections with an air-compressor, with pipe connections with solution-tanks, with a gas-absorbing chamber, with an ore-conveyer, with a solution-pump, with a sand-pump and with an electrolytic or other gold and silver precipitating apparatus, substantially as described.

In testimony whereof I have signed my name to this specification in the presence of two subscribing witnesses.

SIDNEY T. MUFFLY.

Witnesses:
WILLIAM E. BRADLEY,
JOS. H. KLEIN.